(12) United States Patent
Herz

(10) Patent No.: US 7,969,443 B2
(45) Date of Patent: *Jun. 28, 2011

(54) SYSTEM AND METHOD FOR DYNAMICALLY PROCESSING CONTENT BEING COMMUNICATED OVER A NETWORK FOR DISPLAY PURPOSES

(75) Inventor: William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 695 days.

This patent is subject to a terminal disclaimer.

(21) Appl. No.: 11/461,676

(22) Filed: Aug. 1, 2006

(65) Prior Publication Data

US 2008/0030508 A1 Feb. 7, 2008

(51) Int. Cl.
*G06F 15/16* (2006.01)
*G06F 15/00* (2006.01)
*G06F 9/46* (2006.01)

(52) U.S. Cl. .......... 345/502; 345/501; 718/104

(58) Field of Classification Search ........ 345/501, 345/502; 718/104, 105
See application file for complete search history.

(56) References Cited

U.S. PATENT DOCUMENTS

| | | | | |
|---|---|---|---|---|
| 6,473,085 B1 * | 10/2002 | Brock et al. | ........ | 345/502 |
| 6,557,065 B1 * | 4/2003 | Peleg et al. | ........ | 710/300 |
| 6,889,385 B1 * | 5/2005 | Rakib et al. | ........ | 725/119 |
| 7,016,409 B2 * | 3/2006 | Unger | ........ | 375/240.02 |
| 7,053,863 B2 * | 5/2006 | Glen et al. | ........ | 345/2.3 |
| 7,177,329 B2 | 2/2007 | Kobayashi | ........ | 370/524 |
| 7,313,796 B2 | 12/2007 | Hamilton et al. | ........ | 718/104 |
| 2006/0025169 A1 * | 2/2006 | Maciocco et al. | ........ | 455/525 |
| 2006/0164550 A1 | 7/2006 | Yoshimoto et al. | | |
| 2006/0232590 A1 | 10/2006 | Bakalash et al. | | |
| 2006/0267989 A1 | 11/2006 | Campbell et al. | ........ | 345/502 |
| 2007/0013693 A1 * | 1/2007 | Hedrick | ........ | 345/419 |
| 2008/0030507 A1 | 2/2008 | Herz | ........ | 345/502 |
| 2008/0030508 A1 | 2/2008 | Herz | | |

FOREIGN PATENT DOCUMENTS

JP 6149694 A 5/1994
WO 2004049581 A2 6/2004

OTHER PUBLICATIONS

U.S. Appl. No. 10/990,712, filed Nov. 17, 2004.
Office Action Summary from U.S. Appl. No. 11/461,670 mailed Apr. 9, 2009.
Final Office Action Summary from U.S. Appl. No. 11/461,670 mailed on Nov. 3, 2009.
Non-Final Office Action Summary from U.S. Appl. No. 11/461,670 mailed on Jun. 23, 2010.
First Office Action from Chinese Patent Application No. 2007101435000, dated Apr. 24, 2009.
Decision on Rejection from Chinese Patent Application No. 2007101435000, dated Oct. 23, 2009.
Notice of Final Rejection from Japanese Patent Application No. 2007-201047, dated Apr. 6, 2010. Notice of Reasons of Reasons for Rejection from Japanese Patent Application No. 2007-201047, dated Oct. 20, 2009.

(Continued)

*Primary Examiner* — Joni Hsu
(74) *Attorney, Agent, or Firm* — Zilka-Kotab, PC

(57) ABSTRACT

A system and method are provided for dynamically selecting one or more modules of a graphics processor for processing content to support communication of the content over a wireless network link for subsequent display of the content utilizing a display.

19 Claims, 6 Drawing Sheets

OTHER PUBLICATIONS

Notice of Preliminary Rejection from Korean Patent Application No. 10-2007-0077532, dated Jan. 30, 2009.
Notice of Preliminary Rejection (English Translation) from Korean Patent Application No. 10-2007-0077532, dated Aug. 28, 2009.

Office Action from Taiwan Patent Application No. 096128253, dated Jan. 6, 2011.
Notice of Allowance from U.S. Appl. No. 11/461,670, dated Feb. 7, 2011.

* cited by examiner

SYSTEM AND METHOD FOR DYNAMICALLY PROCESSING CONTENT BEING COMMUNICATED OVER A NETWORK FOR DISPLAY PURPOSES

FIELD OF THE INVENTION

The present invention relates to digital processing, and more particularly to graphics/video processing.

BACKGROUND

Prior Art FIG. 1A illustrates a system 100 for graphics/video processing, in accordance with the prior art. As shown, a graphics processor 102 is directly coupled to a display 104 in such prior art system 100. To this end, all necessary graphics and/or video processing of content to be displayed may be performed by the graphics processor 102 and then sent directly to the display 104 in a format ready for display. While such system 100 is ideal for traditional computer systems, it is not necessarily convenient for other frameworks.

For example, Prior Art FIG. 1B illustrates a system 150 for graphics/video processing in the context of a wireless network 106, in accordance with the prior art. As shown, in such configuration, the graphics processor 102 communicates with the display 104 via the network 106. Such network 106 may include a wireless network link employing ultra wide band (UWB) technology, wireless universal serial bus (WUSB) technology, WiMedia technology, and/or any other desired network-related technology.

While such configuration may afford acceptable performance in the context of certain high-speed networks, problems may still arise as a result of any bandwidth limitations associated with the network 106. Specifically, the conventional format associated with the content, the graphics processor output, the processing architecture, etc. may not be conducive to efficient network transmission. For example, the content may possibly be encrypted, compressed, etc.

Thus, if the bandwidth is insufficient albeit large, this may result in difficulties with the display of the content and possibly an inability to do so. There is thus a need for overcoming these and/or other problems associated with the prior art.

SUMMARY

A system and method are provided for dynamically selecting one or more modules of a graphics processor for processing content to support communication of the content over a wireless network link for subsequent display of the content utilizing a display.

BRIEF DESCRIPTION OF THE DRAWINGS

Prior Art

Prior Art

DETAILED DESCRIPTION

Figure 1A:
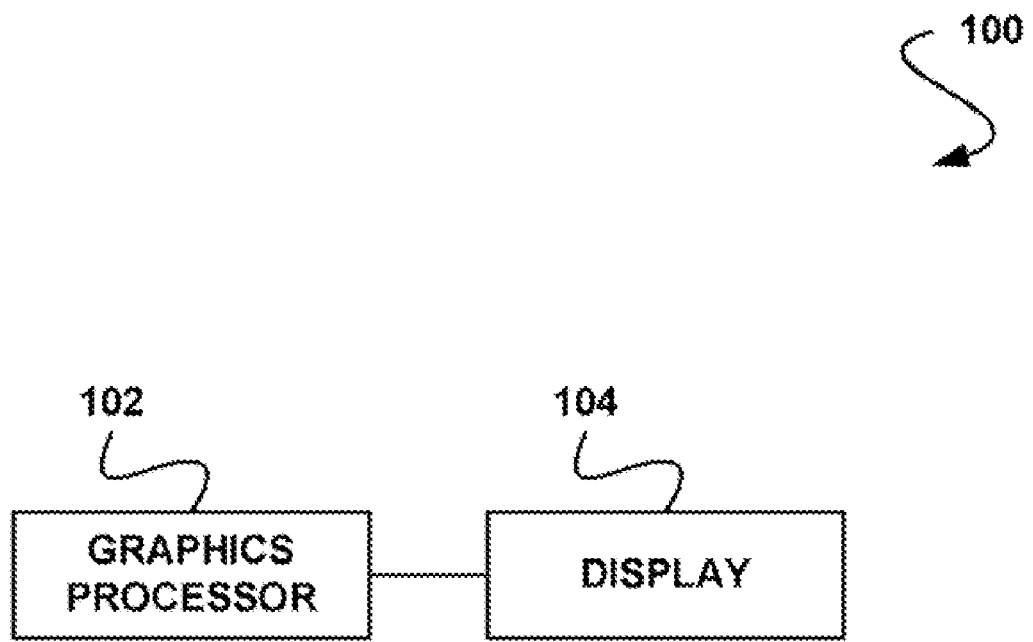
FIG. 1A illustrates a system for graphics/video processing, in accordance with the prior art.
Figure 1B:
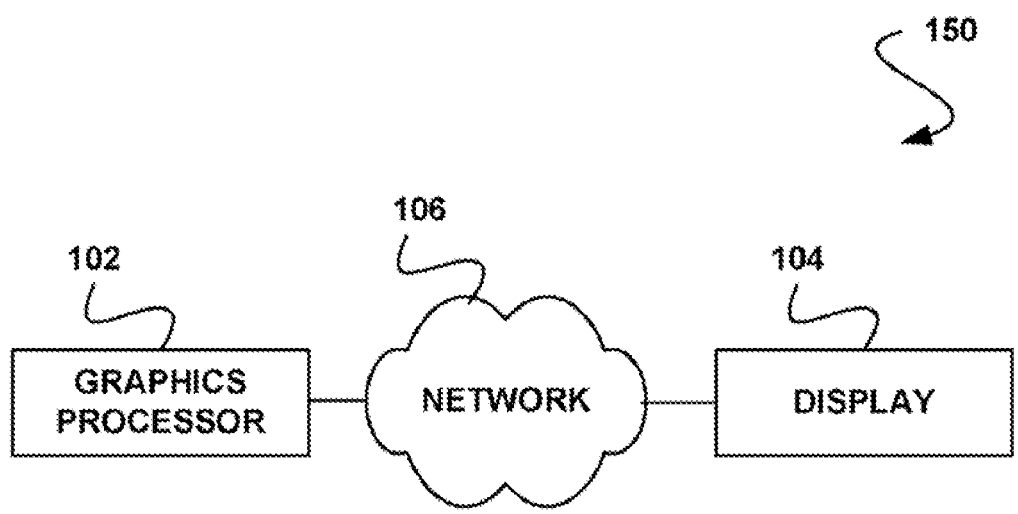
FIG. 1B illustrates a system for graphics/video processing in the context of a wireless network, in accordance with the prior art.
Figure 2:
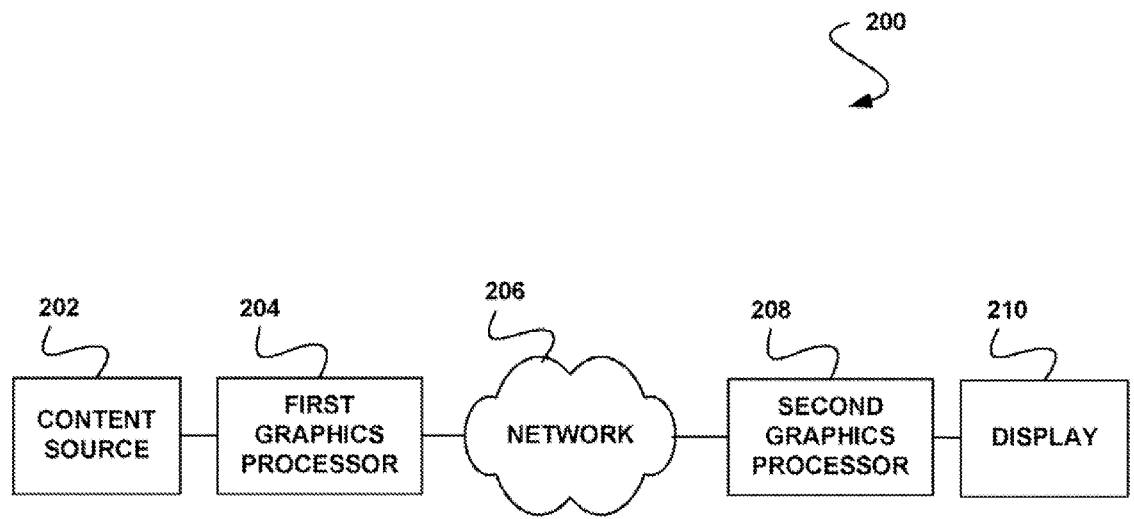
FIG. 2 shows a system for processing content communicated over a network for display purposes, in accordance with one embodiment.

FIG. 2 shows a system 200 for processing content communicated over a network for display purposes, in accordance with one embodiment. As shown, included is a content source 202 that serves to feed a first graphics processor 204 for processing (e.g. graphics processing and/or video processing, etc.) content from the content source 202. In the context of the present description, such content source 202 may refer to any source of content [e.g. network, memory in the form of a digital versatile disc (DVD), hard disk, etc.], where the content may include graphics data and/or video capable of being processed for display purposes. Of course, in various embodiments, the content may even optionally include audio and/or meta data.

As further shown, also included is a second graphics processor 208 in communication with the first graphics processor 204 via a network 206. The second graphics processor 208 is also adapted for further processing (e.g. graphics processing and/or video processing, etc.) the content for display purposes. As shown, a display 210 may remain in communication with the second graphics processor 208 for such purposes. It should be noted that, while the graphics processors are shown to be directly linked to the remaining respective components, such links are representative of communication only. Thus, the system 200 may or may not include additional components in communication between the graphics processors. It should be noted that other embodiments are also contemplated where a processor(s) is employed in lieu of the aforementioned graphics processor(s), where such processor is capable of video processing without necessarily any graphics processing.

It should also be noted that the network 206 may take any form including, but not limited to a local area network (LAN), a wireless network, a wide area network (WAN) such as the Internet, a peer-to-peer network, etc. In various optional embodiments, the network 206 may involve a wireless network link which, in the context of the present description, includes any connection associated with a wireless network. Just by way of example, such a wireless network link may employ ultra wide band (UWB) technology, wireless universal serial bus (WUSB) technology, WiMedia technology, etc. More information regarding one possible embodiment involving a wireless network will be set forth hereinafter during reference to subsequent figures.

In use, the first graphics processor 204 and the second graphics processor 208 are adapted for processing such content. In various embodiments, the first graphics processor 204 and the second graphics processor 208 may or may not be asymmetrical. For example, in one exemplary embodiment, a first amount of processing performed by the first graphics processor 204 may be a reciprocal function of a second amount of the processing performed by the second graphics processor 208. Again, more information regarding one possible embodiment involving such dynamic adaptability will be set forth hereinafter during reference to subsequent figures.

In still other embodiments, the processing performed by the first graphics processor 204 (and/or even the second graphics processor 208, for that matter) may be dynamically adaptable. For instance, the processing performed by the first graphics processor 204 may change as a function of any one of various factors. Just by way of example, such processing may change as a function of a bandwidth, a desired quality of service (QoS), at least one aspect of the content or display, a type or amount of processing carried out by the second graphics processor 208, and/or any other desired factor.

Still yet, the processing performed by the first graphics processor 204 and/or the second graphics processor 208 may include, but is not limited to decryption, decompression, post-processing, multiplexing, de-multiplexing, processing that provides for error correction, packetization, de-packetization, graphics rendering, composing, re-compression, and/or re-encryption. Of course, in the context of the present description, such processing performed by the first graphics processor 204 and/or the second graphics processor 208 may include any processing that results, at least in part, in the content being transmitted and/or displayed via the network.

In still yet another optional embodiment, the first and/or second graphics processor may include one of a plurality of graphics processors that operate in conjunction with each other. One example of such technology is the NVIDIA SLI™ technology. More information regarding one example of a related embodiment may be found by reference to application Ser. No. 10/990,712 filed Nov. 17, 2004, which is incorporated herein by reference in its entirety.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
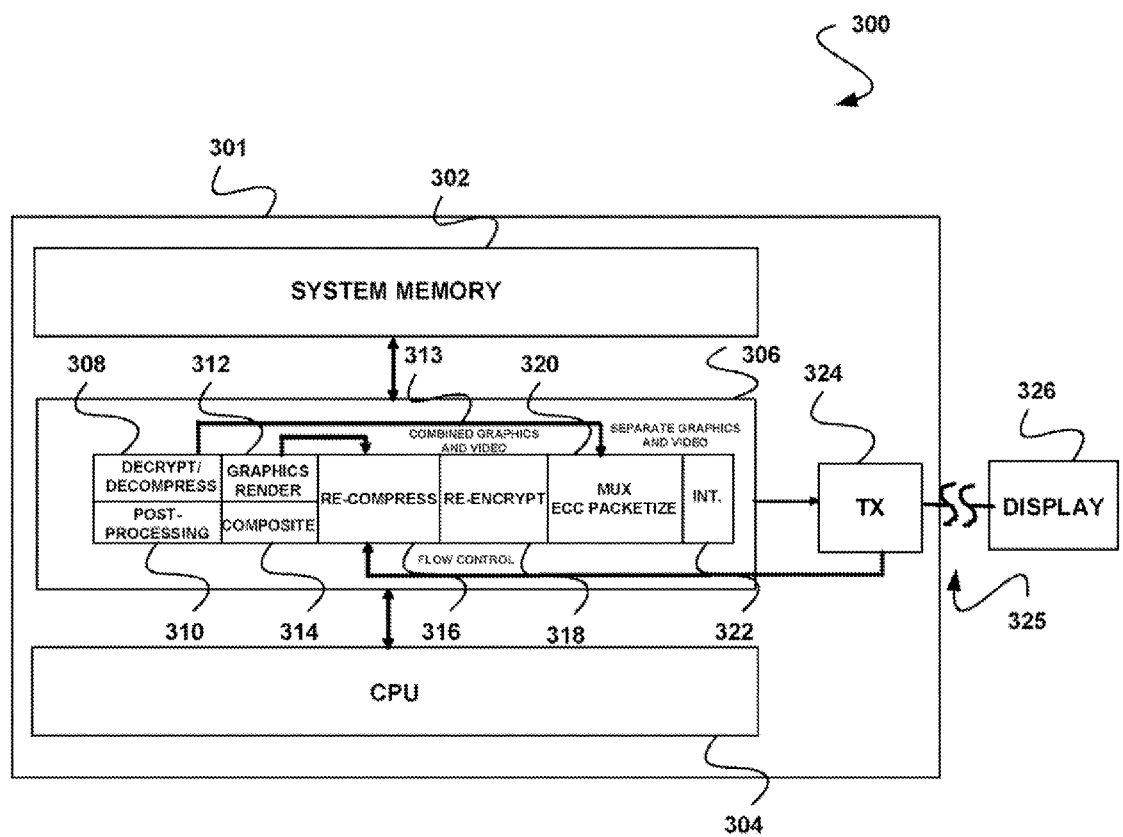
FIG. 3 shows a system for processing content prior to being communicated over a wireless network link, in accordance with one exemplary embodiment.

FIG. 3 shows a system 300 for processing content prior to being communicated over a wireless network link, in accordance with one exemplary embodiment. As an option, the present system 300 may be implemented under the principles of the system 200 of FIG. 2. Of course, however, the system 300 may be implemented in any desired environment. Still yet, the above definitions apply during the following description.

As shown, the system 300 includes a graphics processing 306 which may serve in conjunction with a computer 301, in one embodiment. Such computer may include memory 302 and a central processing unit 304 (CPU) in communication with the graphics processor 306.

In one embodiment, the graphics processor 306 may include a plurality of modules, as shown. Each of such modules may even be situated on a single semiconductor platform to form a graphics processing unit (GPU) [e.g. a discrete GPU, an integrated GPU (iGPU), etc.].

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

With continuing reference to FIG. 3, the graphics processor 306 includes a plurality of modules including a decryption/decompression module 308, post-processing module 310, graphics rendering module 312, compositing module 314, re-compression module 316, re-encryption module 318, multiplexer/error correction/packetization module 320, and an interface 322. While various combinations of using (and not using) these various modules are set forth below, it should be strongly noted that, depending on content and/or processing-related requirements, any one or more of the foregoing modules may or may not be included and/or used in the context of a transmitter and/or receiver, as appropriate.

In use, the decryption/decompression module 308 receives content from a content source (e.g. see, for example, the content source 202 of FIG. 2, etc.). In an embodiment where such content is encrypted and/or compressed, the decryption/decompression module 308 serves to decrypt and/or decompress such content for further processing. For example, in a case where the content includes MPEG-formatted video, such formatting may be decompressed, etc. Still yet, the module 308 may serve to separate any video from graphics data, for reasons that will soon become apparent.

As an option (particularly if the content includes video), the post-processing module 310 may serve for any desired post-processing that may be desired. Such post-processing may include, but is not limited to pixel processing, video processing (e.g. gamma correction, motion estimation or compensation, decompression, color space control, brightness, saturation, color temperature correction, sharpening, overlay processing, scaling, encoding, de-interlacing, up/down scaling, etc.), etc. Such examples are set forth for illustrative purposes only and should not be construed as limiting in any manner, since any type of post-processing may be performed by the post-processing module 310.

As an additional option, if the content includes graphics data that may leverage the graphics processing capabilities of the graphics processor 306, the content may be input to the graphics rendering module 312 for any type of graphics processing including, but not limited to pixel shading, texture shading, etc. For example, electronic programming guide (EPG) information may be incorporated with the video, where such EPG information may be the subject of the aforementioned graphics processing.

If it is desired that the content include separated graphics data (if any) and video (e.g. in separate streams) and available bandwidth permits, one or more of the various illustrated modules may be skipped for bypassing to the multiplexer/error correction-related processing/packetization module 320 (which will be described later in greater detail). See route 313. It should be further noted that a mode of operation is contemplated where no post-processing, graphics rendering, etc. is needed or desired, and therefore the decryption/decompression module 308 may simply pass the content without such processing.

On the other hand, if graphics data and video are to be combined (e.g. in a single stream, etc.), an output of the graphics rendering module 312 may, in turn, be fed to the compositing module 314. As such, the compositing module 314 may serve to composite any uncompressed video content with the resultant graphics data. While such compositing content may take any form, it may, in some embodiments, include a composite National Television System Committee (NTSC) format, phase alternating line (PAL) format, Y/C (S-video) format, sequential couleur avec memoire (SECAM) format, high definition television (HDTV) format, Advanced Television Systems Committee (ATSC) format, any digital television format capable of being compressed, and/or other format that may include video, graphics data, and/or a combination of video and graphics data.

To this end, the combined graphics data and video may be re-compressed by the re-compression module 316 and further re-encrypted by the re-encryption module 318. Such re-compression/re-encryption may serve to be beneficial in various environments. For example, in an embodiment where the content is to be communicated via a high-definition channel (e.g. where throughput is 1920×1080×24×60=3.3 Gb/s), such re-compression/re-encryption may serve to ensure that the graphics data, etc. is capable of being feasibly communicated via such medium.

Still yet, whether the content is fed from such modules or directly from the decryption/decompression module 308/ post-processing module 310, the content is then processed by the multiplexer/error correction-related processing/packetization module 320. Specifically, such module 320 serves to perform any desired processing that provides for error correction utilizing any available parity information, and packetize the content so that resulting packets may be multiplexed via an interface 322.

Also included is a transmitter 324 in communication with the graphics processor 306 for transmitting the content over a wireless network 325 so that such content may be displayed utilizing a display 326. In various embodiments, such transmitter 324 may employ a wireless network link utilizing UWB technology, WUSB technology, WiMedia technology, etc. Further, more information regarding such display 326 will be set forth in greater detail during reference to FIG. 4.

As mentioned earlier, the processing performed by the graphics processor 306 may be dynamically adaptable. Further, such processing may be adapted as a function of a bandwidth, a desired quality of service (QoS), a type or amount of processing carried out by a second graphics processor (to be described later), and/or any other desired factor. To facilitate this feature, feedback from the transmitter 324 may be communicated back to the appropriate module(s) of the graphics processor 306, in the manner shown.

For example, if the transmitter 324 detects a change in available bandwidth, it may instruct the re-compression module 316 and/or re-encryption module 318 to utilize a more advanced compression/encryption algorithm to accommodate such change. Of course, such change may come at the expense of more processing cycles, etc. Similar adaptability may be exhibited in response to a change in a desired QoS, etc. More information regarding such dynamic adaptability will be set forth in greater detail during reference to FIG. 5.

While not shown, the system 300 may also include a secondary storage. The secondary storage may include, for example, a hard disk and/or removable storage, representing a floppy disk, a magnetic tape, a compact disk, a DVD, solid state storage (e.g. flash memory), etc. In use, a removable storage drive reads from and/or writes to the removable storage in a well known manner.

Computer programs, or computer control logic algorithms, may be stored in the system memory 302 and/or the secondary storage. Such computer programs, when executed, enable the system 300 to perform various functions. The system memory 302, storage and/or any other storage are possible examples of computer-readable media.

In one embodiment, the various functionality set forth herein may be implemented, in part, in the context of the CPU 304, a chipset (i.e. a group of integrated circuits designed to work and sold as a unit for performing related functions, etc.), and/or any other integrated circuit for that matter. Still yet, the architecture and/or functionality set forth herein may be implemented in the context of a general computer system, a circuit board system, a game console system dedicated for entertainment purposes, an application-specific system, and/ or any other desired system, for that matter.

Figure 4:
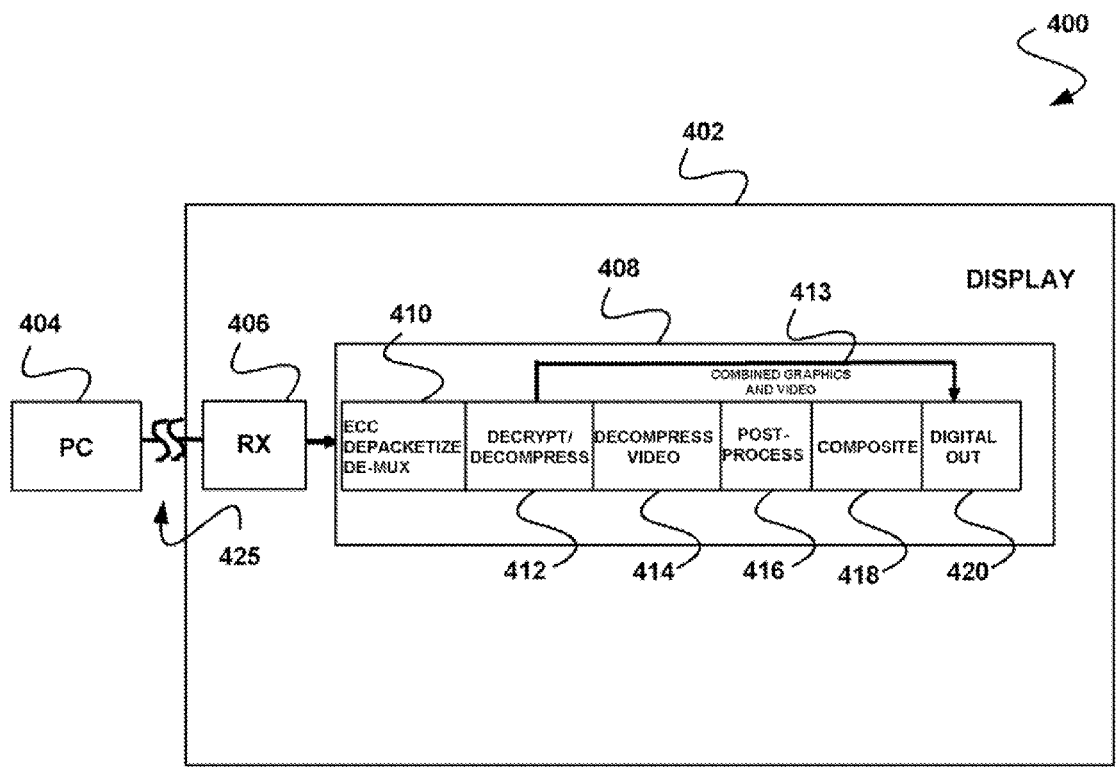
FIG. 4 shows a system for processing content after being communicated over a wireless network link, in accordance with another exemplary embodiment.

FIG. 4 shows a system 400 for processing content after being communicated over a wireless network link, in accordance with another exemplary embodiment. As an option, the present system 400 may be implemented under the principles of the system 200 of FIG. 2. Of course, however, the system 400 may be implemented in any desired environment. Still yet, the above definitions apply during the following description.

As shown, included is a computer system 404 that operates to communicate content to the system 400 via a wireless network 425. In one embodiment, such computer system 404 may include the system 300 of FIG. 3. The system 400 is illustrated to include a graphics processor 408 that communicates with the network 425 via a receiver 406. As an option, the system 400 may take the form of a display 402 where the graphics processor 408 is incorporated therein.

With continuing reference to FIG. 4, the graphics processor 408 includes a plurality of modules including a de-multiplexer/error correction-related processing/de-packetization module 410, graphics decryption/decompression module 412, video decompression module 414, post-processing module 416, compositing module 418, and a digital output 420.

In use, content is fed from the receiver 406 to the de-multiplexer/error correction-related processing/de-packetization module 410 for performing functionality that compliments the functions of the multiplexer/error correction-related processing/packetization module 320 of FIG. 3. Specifically, the content may be processed for providing error-correction capabilities, de-packetized, and further de-multiplexed. Further, any video may or may not be separated from any graphics data after decryption and/or decompression via the graphics decryption/decompression module 412.

As an option, the graphics data and the video may remain combined (e.g. in a single stream, etc.) and transmitted at this point directly to the digital output 420 for display purposes. See route 413. On the other hand, processing of any video may proceed by de-compressing the same utilizing the video decompression module 414. In various embodiments where the content is premium in nature, such video de-compression may serve to support advanced access content system (AACS)/Windows media-digital rights managements (WM-DRM), COPPP-compliant DRM, etc.

Still yet, post-processing may optionally be performed with the post-processing module 416. Of course, such post-processing may include any processing mentioned hereinabove during the description of analogous module 310 of FIG. 3.

Further, as mentioned previously, a first amount of processing performed by the graphics processor 306 of FIG. 3 may be a reciprocal function of a second amount of the processing performed by the graphics processor 408. For example, the required post-processing may be shared amongst the respective post-processing modules 310 and 416, and may further be adapted for any differences regarding the video being processed. Still yet, the compositing module 418 may serve to function similar to the analogous module 314 of FIG. 3.

As mentioned earlier, depending on content/processing-related requirements, any one or more of the foregoing modules of each of the graphics processors of FIGS. 3-4 may or may not be used. Specifically, during use, at least one or more of the modules of the graphics processors may be selected for supporting the communication of the content over a network to be subsequently displayed. More information regarding such dynamic adaptability will now be set forth.

Figure 5:
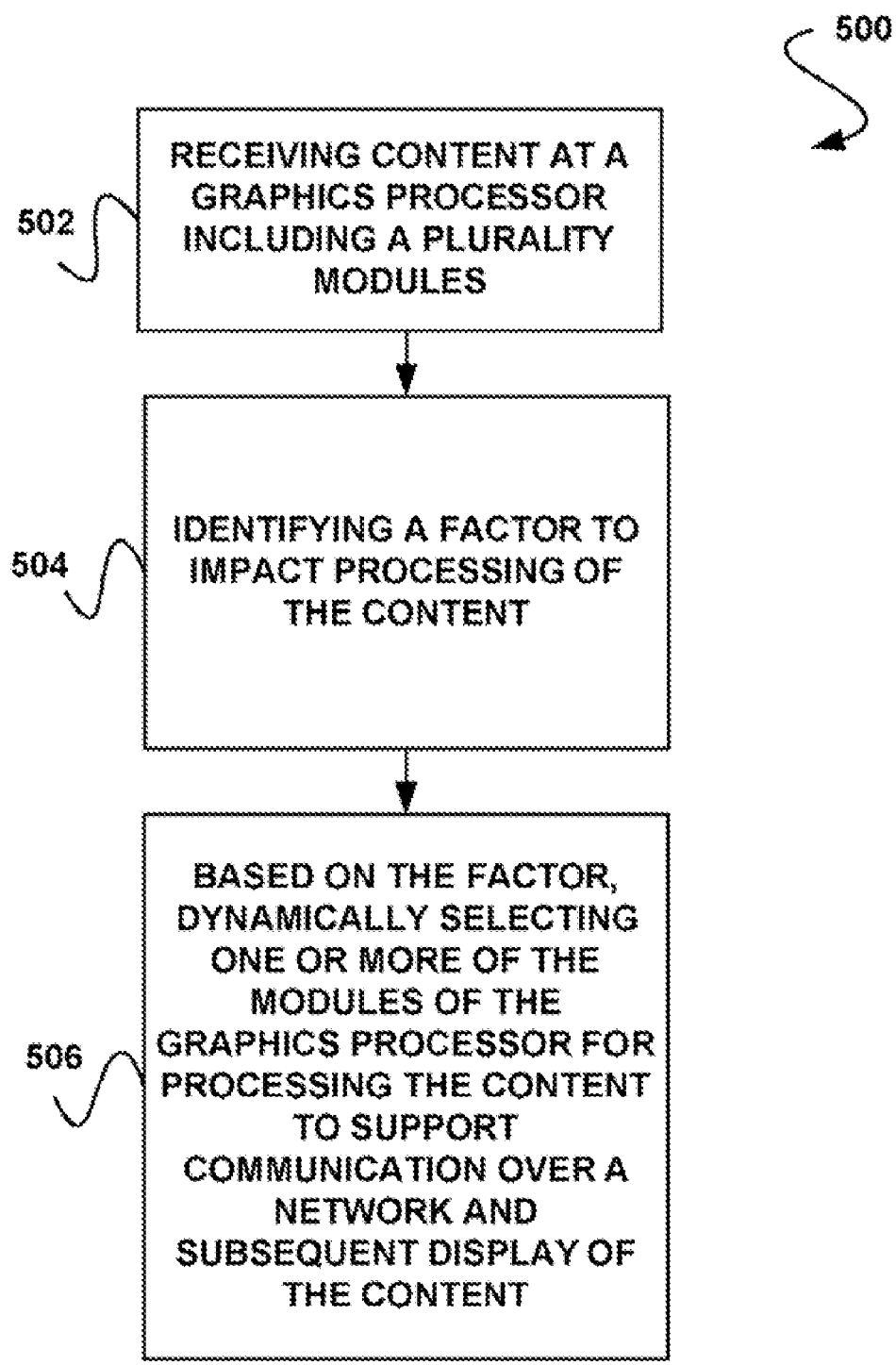
FIG. 5 shows a method for dynamically processing content being communicated over a wireless network link for display purposes, in accordance with one exemplary embodiment.

FIG. 5 shows a method 500 for dynamically processing content being communicated over a wireless network link for display purposes, in accordance with one exemplary embodiment. As an option, the present method 500 may be implemented under the principles of the system 200 of FIG. 2. Of course, however, the method 500 may be implemented in any desired environment. For example, it is contemplated that the method 500 may be implemented only in the context of one graphics processor (e.g. see, for example, the first graphics processor 204 and/or second graphics processor 208 of FIG. 2, etc.).

As shown, content is received at a graphics processor including a plurality of modules. See operation 502. For example, in one embodiment where the graphics processor includes the first graphics processor 204 of FIG. 2 or the like, the various modules may include one or more of the following: an encryption module, a compression module, a decryption module, a decompression module, a post-processing module, a graphics processing module, and/or a compositing module (as set forth earlier). In such embodiment, the graphics processor may be integrated or remain separate from an associated computer.

In another embodiment where the graphics processor includes the second graphics processor 208 of FIG. 2 or the like, the various modules may include one or more of the following: a decryption module, a decompression module, a de-packetization module, a post-processing module, a de-multiplexing module, a compositing module, and an error correction-related processing module (as set forth earlier). In the present embodiment, the graphics processor may be integrated or remain separate from an associated display.

With continuing reference to FIG. 5, a factor that impacts to-be-described processing of the content is identified. Note operation 504. As mentioned earlier, such factor may include a bandwidth, a desired quality of service (QoS), at least one aspect of the content (e.g. format, size, etc.) or display, a type or amount of processing carried out by another graphics processor (if it exits), and/or any other desired factor. As a further option, various feedback may be used to provide the above factor.

To this end, one or more of the modules of the graphics processor may be dynamically selected for processing the content to support communication over a network and/or subsequent display of the content utilizing a display. Note operation 506. It should be noted that such processing may vary depending on which end of the network the graphics processor resides.

For example, in the aforementioned embodiment where the graphics processor includes the first graphics processor 204 of FIG. 2 or the like, the processing may involve preparing the content for transmission over the network. Further, such processing performed by the selected modules may include decryption, decompression, post-processing, multiplexing, processing that provides for error correction, packetization, graphics rendering, compositing, re-compression, and/or re-encryption.

Still yet, in the aforementioned embodiment where the graphics processor includes the second graphics processor 208 of FIG. 2 or the like, the processing may include receiving and preparing the content for display utilizing the display. Again, such processing performed by the selected modules may include decryption, decompression, de-packetization, post-processing, de-multiplexing, compositing, and/or processing that provides for error correction.

Of course, absolutely any type of module and associated processing that is capable of supporting communication of the content over the network for subsequent display utilizing the display may be provided and dynamically selected in the aforementioned manner.

Thus, depending on current requirements, various scenarios may be accommodated. For instance, incoming compressed content may or may not be decrypted/decompressed and, if so, various additional processing (e.g. graphics processing, compositing, etc.) may or may not be performed.

Again, all of such selections may be carried out as a function of any desired factor including, but not limited to QoS requirements, network limitations (e.g. bandwidth, etc.), a received format of the content, a desired format of the content for network transmission, user configurations/requirements, etc.

In the context of one specific example, content may be received in a compressed/encrypted format for which no desired additional processing is needed (e.g. all bandwidth, QoS, etc. requirements are met, etc.). In such case, the content may not necessarily be decrypted/decompressed, and simply transmitted. In another embodiment, the decrypted/decompressed content may require additional processing and thus be decrypted/decompressed so that post-processing, graphics processing, etc. may be performed. At that point, re-compression/de-compression may or may not be performed based on relevant needs.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving content at a graphics processor including a plurality of modules; and
dynamically selecting one or more of the modules of the graphics processor for processing the content to support communication over a wireless network link and subsequent displaying of the content utilizing a display;
wherein the processing includes preparing the content for transmission over the wireless network link;
wherein in response to detection by a transmitter utilized for transmitting the content over the wireless network link of a change in available bandwidth of the wireless network link, the transmitter instructs at least one of the modules to process the content in a manner that accommodates the change.

2. The method as recited in claim 1, wherein the graphics processor includes a graphics processing unit.

3. The method as recited in claim 1, wherein the modules include an encryption module.

4. The method as recited in claim 1, wherein the modules include a compression module.

5. The method as recited in claim 1, wherein the modules include a decryption module.

6. The method as recited in claim 1, wherein the modules include a decompression module.

7. The method as recited in claim 1, wherein the modules include a post-processing module.

8. The method as recited in claim 1, wherein the modules include a graphics processing module, 9. The method as recited in claim 1, wherein the modules include a compositing module.

10. The method as recited in claim 1, wherein e processing performed by the graphics processor includes at least one of decryption, decompression, post-processing, multiplexing, processing that provides for error correction, packetization, graphics rendering, compositing, re-compression, and re-encryption.

11. The method as recited in claim 1, wherein the modules are dynamically selected based on a desired quality of service.

12. The method as recited in claim 1, wherein the modules are dynamically selected based on at least one aspect of the content or the display.

13. The method as recited in claim 1, wherein the modules are dynamically selected based on at least one aspect of the available bandwidth of the wireless network link.

14. The method as recited in claim 1, wherein the processing is adapted as a function of a type of processing carried out by a second graphics processor in communication with the graphics processor via a network.

15. The method as recited in claim 14, wherein the second graphics processor receives the content from the graphics processor over the wireless network link and the processing is adapted as function of the type of the processing carried out by the second graphics processor by changing the processing as the function of the type of the processing carried out by the second graphics processor.

16. The method as recited in claim 14, wherein a first amount of processing performed by the graphics processor is a reciprocal function of a second amount of processing performed by the second graphics processor.

17. A computer program product embodied on a non-transitory computer readable medium, comprising:
   computer code for dynamically selecting one or more modules of a graphics or video processor for processing content to support communication of the content over a wireless network link for subsequent display of the content utilizing a display;
   wherein the processing includes preparing the content for transmission over the wireless network link;
   wherein the computer program product is operable such that in response to detection by a transmitter utilized for transmitting the content over the wireless network link of a change in available bandwidth of the wireless network link, the transmitter instructs at least one of the modules to process the content in a manner that accommodates the change.

18. A system, comprising:
   a processor capable of graphics processing or video processing, the processor including a plurality of modules adapted for being dynamically selected to process content to support communication over a wireless network link and subsequent display of the content utilizing a display;
   wherein the processing includes preparing the content for transmission over the wireless network link;
   wherein the system is operable such that in response to detection by a transmitter utilized for transmitting the content over the wireless network link of a change in available bandwidth of the wireless network link, the transmitter instructs at least one of the modules to process the content in a manner that accommodates the change.

19. The system as recited in claim 18, wherein the processor is integrated with a computer.

* * * * *

UNITED STATES PATENT AND TRADEMARK OFFICE
CERTIFICATE OF CORRECTION

| | | |
|---|---|---|
| PATENT NO. | : 7,969,443 B2 | Page 1 of 1 |
| APPLICATION NO. | : 11/461676 | |
| DATED | : June 28, 2011 | |
| INVENTOR(S) | : Herz | |

It is certified that error appears in the above-identified patent and that said Letters Patent is hereby corrected as shown below:

In the claims:
Col. 8, line 55, please replace "module," with --module.--;
Col. 8, line 58, please replace "e" with --the--.

Signed and Sealed this
Fourth Day of October, 2011

David J. Kappos
*Director of the United States Patent and Trademark Office*